United States Patent [19]

Stenzel

[11] Patent Number: 4,767,452

[45] Date of Patent: Aug. 30, 1988

[54] PROCESS FOR SEPARATING METALS BY DISTILLATION AND CONDENSATION

[75] Inventor: Otto Stenzel, Grundau, Fed. Rep. of Germany

[73] Assignee: Leybold-Heraeus GmbH, Cologne, Fed. Rep. of Germany

[21] Appl. No.: 881,636

[22] Filed: Jul. 3, 1986

[30] Foreign Application Priority Data

Oct. 11, 1985 [DE] Fed. Rep. of Germany ....... 3536277

[51] Int. Cl.$^4$ .................. C22B 19/04; C22B 19/18
[52] U.S. Cl. ........................................ 75/63; 75/10.3; 75/88; 266/145
[58] Field of Search ................ 75/63, 88, 10.3; 266/145

[56] References Cited

U.S. PATENT DOCUMENTS 1,006,876 10/1911 Queneau ........................ 75/10.3
1,897,647 2/1933 Hart .................................... 75/61

FOREIGN PATENT DOCUMENTS 1033907 7/1958 Fed. Rep. of Germany.

Primary Examiner—Melvyn J. Andrews
Attorney, Agent, or Firm—Felfe & Lynch

[57] ABSTRACT

Process and equipment for separating molten metals with a distillation part (1) and a condenser part. The metal vessel (12) of the distillation part (1) is tiltable about at least one horizontal articulated axle (15) and is connected to a drive mechanism (18) for generating periodic tilting motions. In this way, it is possible to keep the melt in motion by means of a rocking motion of the melt vessel and to improve the distillation effect and reduce the distillation time.

3 Claims, 1 Drawing Sheet

PROCESS FOR SEPARATING METALS BY DISTILLATION AND CONDENSATION

The invention relates to a process for separating molten metals by distillation and condensation with continuous heating and movement of a metal melt in a melt vessel.

More particularly, the invention relates to a process for dezincifying so-called "Reichschaum", that is, dross from the Parkes process, the dross being a zinc-containing lead-silver-copper alloy that forms when lead is desilvered using zinc. Up to now, such a distillation process has been conducted under vacuum using the so-called Le Ferrer furnace. The Le Ferrer furnace is a stationary furnace with a steel shell and a thick, multi-layer brick lining, in the lower part of which a type of trough is built to receive the molten material. The interior of the furnace has an elliptical cross section, in the upper section of which graphite heating rods are arranged parallel to the axis of the furnace and pass through the entire furnace. A condenser to condense and recover the zinc is attached directly to the furnace transversely to the axis of the furnace. The condenser has a vertical, cylindrical condensing surface, to which a horizontal receiver for the zinc melt is connected. The furnace and condenser each have a tapping hole for the purified and condensed metal melt, respectively.

Experience has shown that the distillation process proceeds extraordinarily slowly, especially towards the end of the process. This can obviously be attributed to the inadequate movement of the melt in the furnace, so that the melt particles from the bottom of the furnace do not adequately reach the surface of the melt, the only place where purification by means of evaporation can occur. Consideration has therefore already been given to moving the melt forcibly and intensively.

Admittedly, when inert gas is blown into the bottom region of the furnace, the gas bubbles rising in the melt will bring about a stirring action; however, this would require the supply of a large amount of expensive inert gas, as well as a considerable increase in the pumping capacity of the vacuum pumps needed for implementing the process.

The installation of a so-called channel inductor, with which forced circulation of the melt could be achieved, constitutes a particular weak point in this type of furnace, because the furnace can never by completely emptied nor completely cooled, as the melt would then solidify in the channels.

From vacuum induction furnaces, it is well known that a melt motion can be produced owing to the fact that the induction coil is split up into individual coils, in which a travelling wave is created by shifting the phase of the power supply. Distillation furnaces such as the Le Ferrer furnace have a very thick brick lining in view of the long service life that is required. This thick lining, however, makes inductive coupling of the melt difficult. Moreover, the external installation of induction coils makes it necessary to use nonmagnetic steel for the furnace shell. In order to penetrate such a shell with adequate field strengths, extremely low frequencies between 1 and 3 Hz would have to be employed. In addition, it is to be expected that the above-described, thick brick lining, which moreover may also be impregnated with metal, will weaken the electromagnetic travelling wave to such an extent, that a sufficiently vigorous stirring action cannot be achieved.

Other theoretically conceivable processes for moving the melt using magnetic fields call for significant expenditures. With regard to the electrodes, which are wetted by the melt, it should be noted that zinc is an extremely aggressive material in comparison to most metals.

It is therefore an object of the invention to provide a process of the type described initially, which can be employed under a vacuum and with which an intensive stirring action in the melt that is to be purified can be achieved in a simple and reliable manner.

This objective is accomplished inventively by the initially described process, owing to the fact that the melt is kept in motion by means of a rocking motion of the melt vessel.

As a result of the rocking motion of the melt, which advantageously takes place in an elongated furnace about an axis of tilt perpendicular to the furnace axis, the melt sloshes back and forth in the direction of the longitudinal axis, an intensive mixing of the melt resulting, so that the melt particles are brought rapidly from the bottom region into region of the surface of the melt. In so doing, the extent of the rocking motion, that is, the amplitude, by which the melt vessel must be moved, can be kept to a minimum, if the frequency of the rocking motion is selected in the range of the natural oscillation frequency (i.e. movement of melt relative to vessel) of the melt. In this way, the motion of the melt is especially intensive because of the resonance process.

The pumping capacity of the vacuum pumps can, moreover, be kept to a minimum, because the pumps must draw off only the flow from any leaks and/or gases released from the melt. Supplementary electromagnetic devices for moving the melt are not required and, in the simplest form, it is possible to make the well known Le Ferrer furnace tiltable in practically an unchanged form by supporting it on an articulated axle and equipping it with a drive mechanism for producing periodic tilting motions.

The intensity of the motion of the melt can advantageously be increased further owing to the fact that the melt, during its back and forth motion, is allowed to flow over at least one obstruction projecting upwards from the bottom of the melt vessel.

In an especially advantageous way, this obstruction can be a dam or a flow barrier extending across the entire width of the melting vessel. Owing to the fact that the melt, in its back and forth motion, flows in free fall over this obstruction into the furnace space that is lower at that moment, every part of the melt is exposed to the vacuum prevailing in the interior of the furnace, so that effective evaporation of the metal that is to be driven off (for example, zinc) is possible. The purifying and swirling actions can be improved further by constructing the edges of the obstruction, where the melt overflows, as sharp-edged.

An example of the operation of the object of the invention will be illustrated in greater detail with the help of FIGS. 1 and 2.

Figure 1:
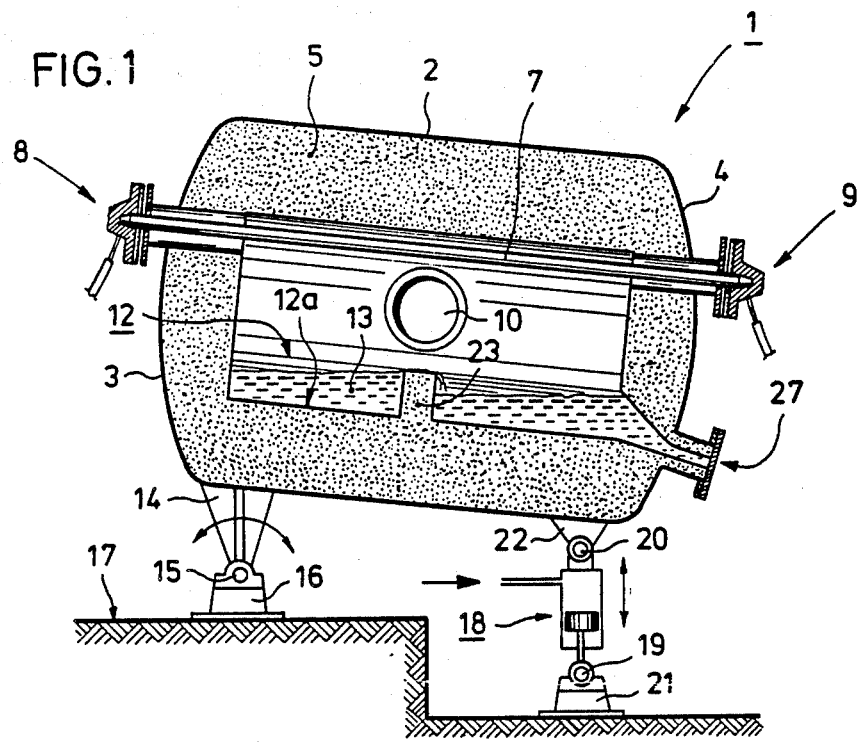
FIG. 1 shows a vertical, axial section through the distillation part of the equipment.
Figure 2:
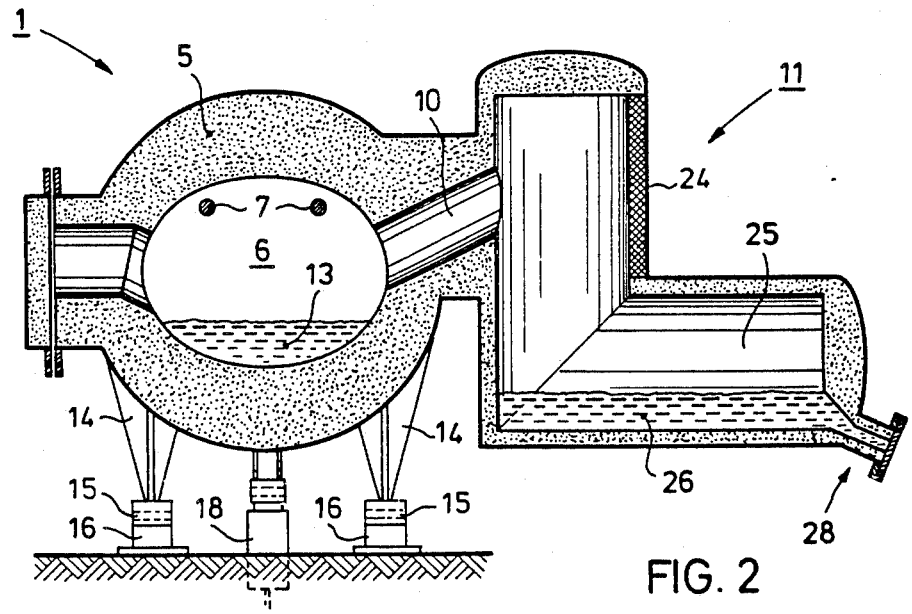
FIG. 2 shows a vertical, radial section through the distillation part in the region of the condenser part, as well as a section in the same plane and through this condenser part.

In FIG. 1, the distillation part 1 of the equipment is shown, which has a cylindrical steel shell 2 with dished heads 3 and 4 on the front ends and a ceramic lining 5 comprising several layers in practice, but represented here as one layer for the sake of simplicity. The lining 5 encloses a furnace interior space 6 having an elliptical cross section (FIG. 2), in the upper region of which two graphite heating rods 7 are provided. These heating rods run parallel to the longitudinal axis of the furnace, that is, parallel to the axis of the steel shell 2. At both ends, the heating rods 7 pass through the dished heads 3 and 4 in a vacuum-tight and electrically insulated manner and their external ends are provided with electrical connections 8 and 9.

A channel 10 runs from the approximate center of the furnace interior space 6 in a lateral direction to a condenser part 11, which is rigidly connected with the distillation part 1. Details will be explained in greater detail below with the help of FIG. 2.

The lower region of the distillation part 1 forms a melting vessel 12, which is filled to a given level with a melt 13 of the material, which is to be purified by distillation. The melting vessel (and, thus, the entire equipment) is connected to horizontal articulated axles 15 of two swivel bearing 16 via struts 14 fastened to the steel shell 2. The swivel bearing 16 are firmly anchored in a mounting surface 17.

At a distance from the coaxial, articulated axles 15, a drive mechanism 18 is disposed between the steel shell 2 and a lower-lying part of the mounting surface 17. The drive mechanism 18 can be constructed as a mechanism driven by a hydraulic piston. The drive mechanism 18 is joined to the steel shell 2 and to the mounting surface 17 via additional articulated axles 19 and 20 and corresponding swivel bearings 21 and 22. By means of a periodic or pulsating actuation of the drive mechanism 18, it is possible to set the melt vessel 12 into a tilting motion about the articulated axles 15, so that the melt 13 moves with a forced frequency in the direction of the longitudinal axis of the melt vessel 12.

On the bottom 12a of the melt vessel, an obstruction 23 projecting upwards is provided, which also is made of a refractory material and, extends across the entire width of the melt vessel 12 and can being constructed in the area of its overflow edges as sharp-edged. The longitudinal axis of the obstruction 23 runs parallel to the articulated axles 15. In this way, two partial spaces for the melt are formed on either side of the obstruction, the height of said spaces periodically changing relative to each other, so that the melt 13 is forced to flow over the obstruction. In so doing, intensive mixing of the melt, as well as an intensive exchange of gas between the surface of the melt and the surrounding atmosphere (vacuum) take place.

The interior space 6 of the furnace is connected via the previously described channel 10 with the condenser part 11, said condenser part having a vertical, cylindrical condensing surface 24 and a horizontal receiver 25 for the condensate 26. The condenser part 11 is naturally subjected to the same tilting or rocking motion as a result of its rigid connection to the distillation part 1, so that a (vulnerable) swivel connection between the distillation part and the condenser part can be omitted.

The distillation part 1 has a tapping hole 27 at one end of the melt vessel 12 for the purified melt 13, while the condenser part 11 has a tapping hole 28 at the lowest point of the receiver 25 for the condensate 26.

I claim:

1. Process for separating molten metals comprising continuously heating and moving a metal melt in a melt vessel over at least one obstruction means which projects upward from a bottom the melt vessel, wherein said metal melt is kept in continuous motion by means for effecting a rocking motion of the melt vessel, distilling a desired metal from said molten melt, drawing said distilled metal from said melt vessel by a drawing off means and condensing said distilled metal in a condenser means secured to the melt vessel, said condenser means having a rocking motion which is the same as that of the melt vessel.

2. Process as in claim 1, wherein said desired metal in zinc.

3. Process as in claim 1 wherein the metal melt has a natural oscillation frequency and the rocking motion has a frequency in the range of the natural oscillation frequency of the metal melt.

* * * * *